(No Model.) 4 Sheets—Sheet 1.

W. S. LAIGHTON & A. P. HITCHCOCK.
CAMERA.

No. 490,117. Patented Jan. 17, 1893.

Witnesses.
Alonzo M. Luther.
Allen Tenny.

Inventors.
William S. Laighton.
A. P. Hitchcock.
By their Attorney
Frank H. Allen.

(No Model.) 4 Sheets—Sheet 2.

W. S. LAIGHTON & A. P. HITCHCOCK.
CAMERA.

No. 490,117. Patented Jan. 17, 1893.

Witnesses.
Alonzo M. Luther.
Allen Tenny.

Inventors.
William S. Laighton.
A. P. Hitchcock.
By their Attorney.
Frank H. Allen.

THE NORRIS PETERS CO., PHOTO-LITHO., WASHINGTON, D. C.

(No Model.) 4 Sheets—Sheet 3.
W. S. LAIGHTON & A. P. HITCHCOCK.
CAMERA.
No. 490,117. Patented Jan. 17, 1893.
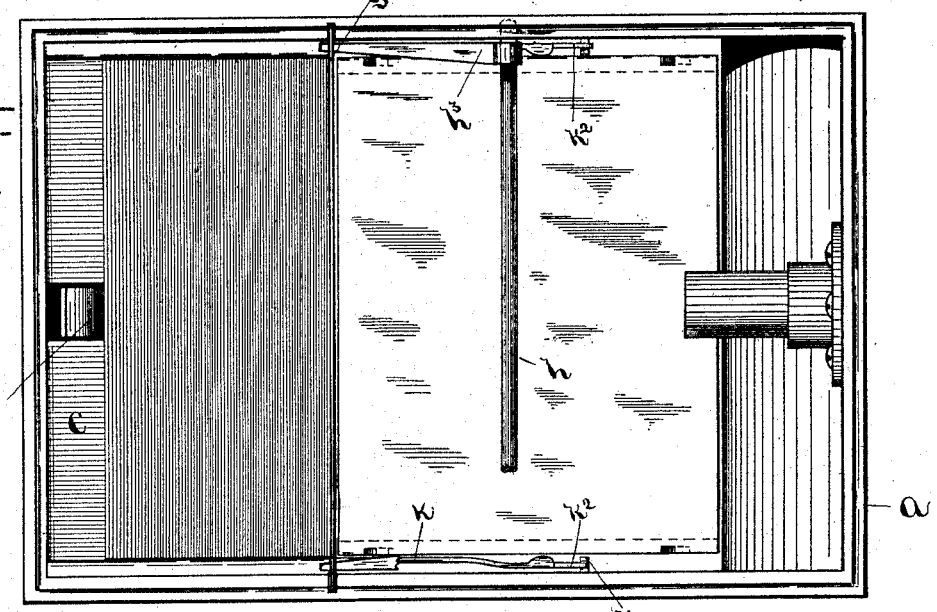
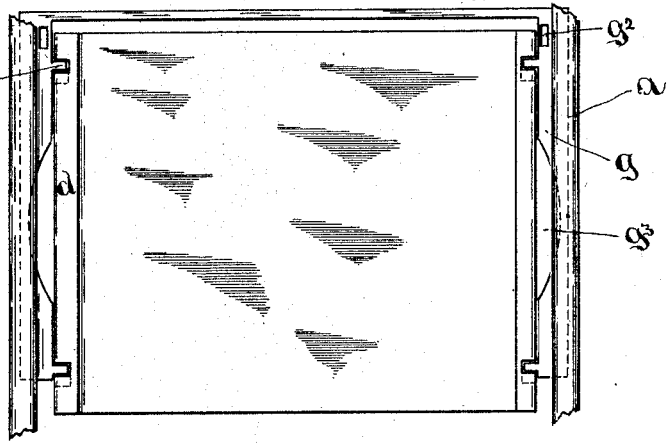
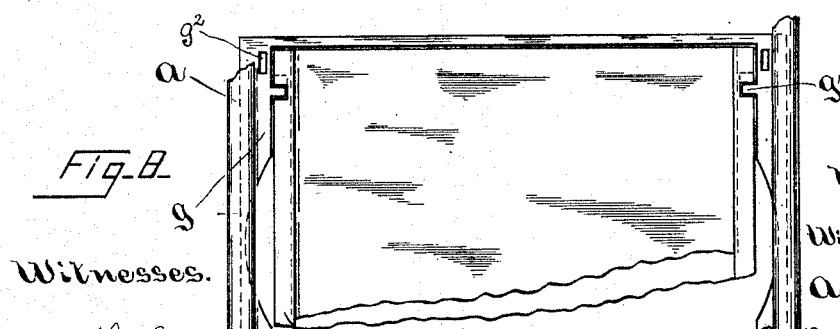

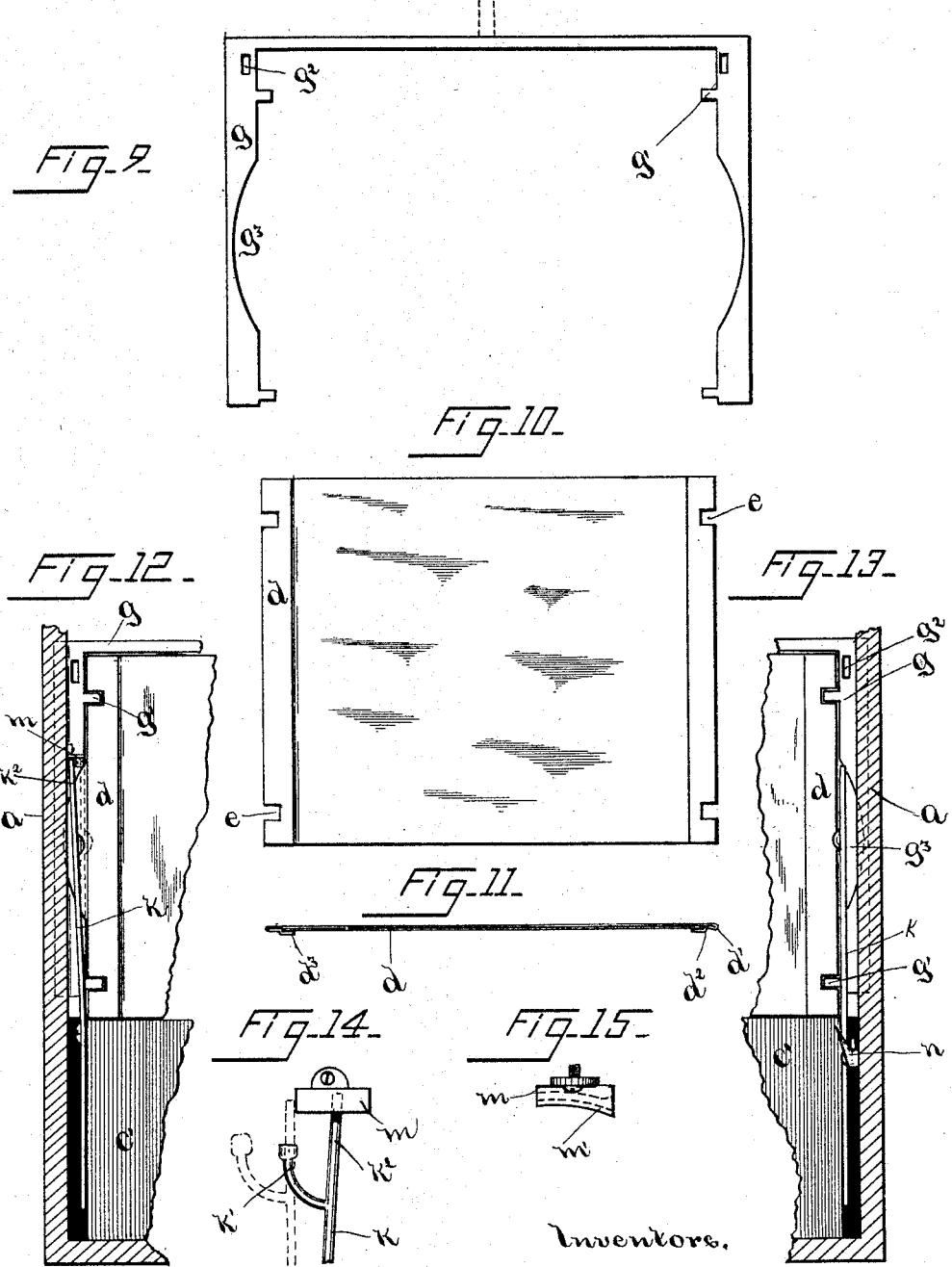

UNITED STATES PATENT OFFICE.

WILLIAM S. LAIGHTON AND A. P. HITCHCOCK, OF NORWICH, CONNECTICUT.

CAMERA.

SPECIFICATION forming part of Letters Patent No. 490,117, dated January 17, 1893.

Application filed October 7, 1891. Serial No. 407,982. (No model.)

*To all whom it may concern:*

Be it known that we, WILLIAM S. LAIGHTON and A. P. HITCHCOCK, both citizens of the United States, and residents of Norwich, in the county of New London and State of Connecticut, have made certain new and useful Improvements in Cameras, which improvements are fully set forth and described in the following specification, reference being had to the accompanying four sheets of drawings.

Our invention has for its object the production of a magazine camera of simple construction and moderate cost, in which cut films (or glass plates if desired) may be conveniently used. The mechanisms provided for holding and manipulating said films are under easy control of the operator and permit the multiple of films to be successively brought into position for exposure and subsequently stored in a suitable receptacle or chamber until such time as it may be desired to remove and develop them.

Figure 1:
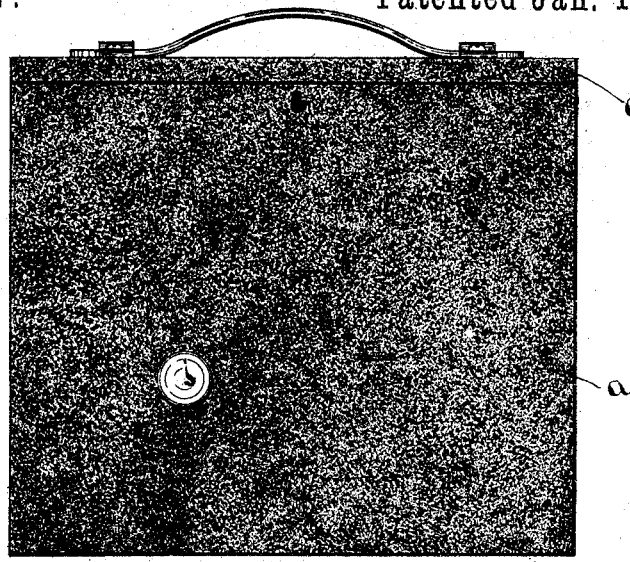
Figure 2:
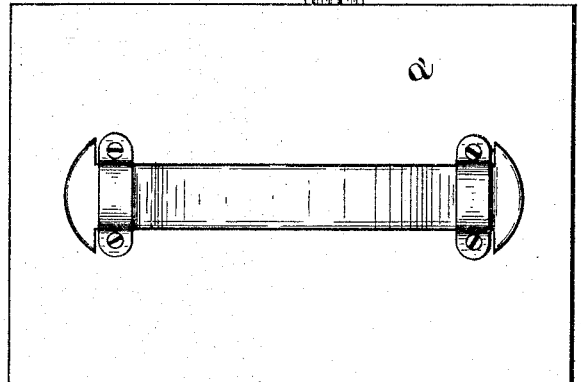
Figure 3:
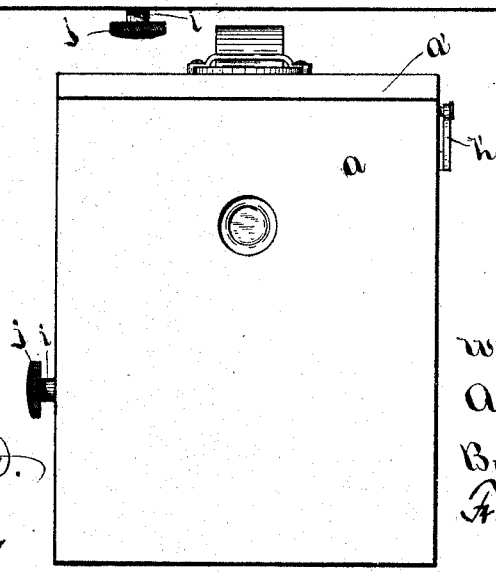
Figure 4:
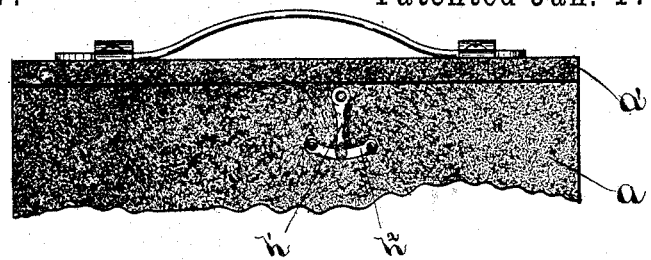
Figure 5:
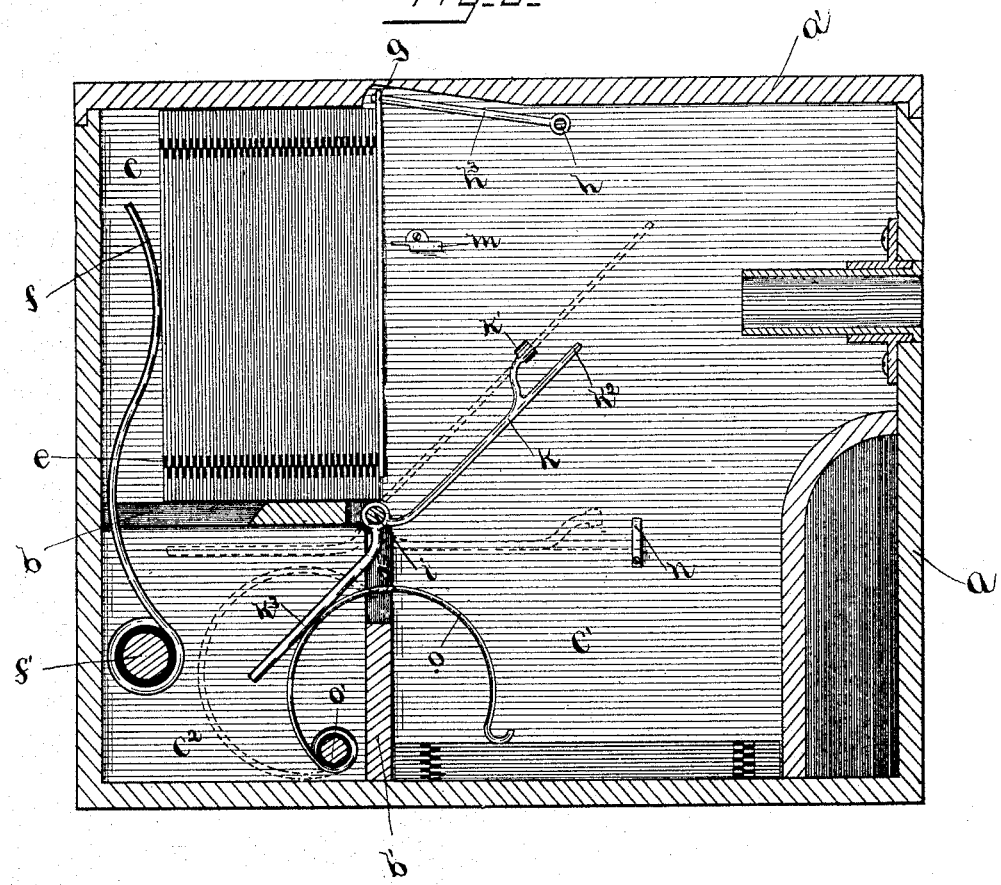

In order to more fully explain our invention we have prepared the annexed drawings, in which Figures 1, 2 and 3 are respectively, side, top and front-end views of a camera embodying our improvements. Fig. 4 is a side view of a portion of the camera, showing the lever provided for moving the interior mechanism by means of which the film carriers are successively released after exposure, as hereinafter explained in detail. Fig. 5 is an enlarged side view largely in section, exposing the interior parts of said camera, and Fig. 6 is a top view with cover removed. Figs. 7 and 8 are front views of a film carrier with the movable frame $g$ in position to release said carrier and Fig. 9 is a detached view of said frame. Fig. 10 is a detached view of one of the film carriers and Fig. 11 a top edge view of the same. Figs. 12 and 13 show portions of a film carrier and of the adjacent box and also illustrate the arm $k$ provided to transfer the film carriers, after exposure, to the receiving chamber below. In Fig. 12 said arm is shown as sprung outward to snap over the edge of the film carrier, while in Fig. 13 said arm is illustrated as having already clasped said carrier. Figs. 14 and 15 show the cam by means of which the outer end of said arm is deflected, at the proper time, to spring over the edge of the carrier.

Referring to these drawings, the letter $a$ indicates the camera box, formed of any suitable material and provided, as here shown, with a hinged cover $a'$ by means of which the interior of box may be reached to fill the magazine and to remove the films that have been exposed. Box $a$ is divided by partitions $b—b'$ into two principal chambers $c—c'$, the former of which serves to receive and support the unexposed films and their carriers, while the latter named chamber provides a receptacle for such carriers after their films have been exposed.

Before describing in detail the various operative elements of the camera box we will refer briefly to the film carrier, which, in connection with said box, forms an important feature of our invention. These carriers $d$ are illustrated most clearly in Figs. 10 and 11 and are made of sheet metal having the sides doubled back as at $d'$, then bent outward at right angles to the main plate, as at $d^2$ and, finally, bent as at $d^3$, parallel with said plate, to provide a rabbet into which the film may be slipped. As the films are ordinarily very thin the complete carriers are correspondingly thin and a great number may be packed into small space. To prevent the films from dropping through the rabbeted portion of the carriers we pinch the lower end of the portion $d$ inward (*i. e.* against the main plate of the carrier) as shown. The edges of the doubled portions $d'$ are notched as at $e$, for a purpose hereinafter explained, and it should be noted that these notches are so predetermined that those of one half of the carriers packed in the magazine are offset from those of the other half. The carriers when packed in the magazine or chamber $b$ fit so perfectly that there is no perceptible lateral displacement yet they may feed, or slide, forward freely as the films are successively exposed and removed. A spring $f$, coiled about a shaft $f'$, is provided, whose free end bears against the rearmost carrier in the magazine and acts with a constant tendency to crowd the entire set of carriers forward into position for exposure.

At the delivery end of the magazine, that is to say, at the place occupied by the plates during exposure, is a frame $g$ arranged to slide vertically, a limited distance, in grooves in the sides of the camera box. The side arms of this frame have inwardly projecting spurs $g'$ of such size and shape that they may enter the carrier notches $e$ when brought into coincidence with said notches. We have stated above that the notches of alternate film carriers are offset from each other. When the vertically movable frame $g$ is adjusted, to permit the notches of the outer carrier to pass over the spurs $g'$, and so release said outer carrier, the entire series of carriers are forced forward by spring $f$ until checked by the spurs, which are then out of alignment with the notches of the next carrier. The next movement, however, of frame $g$ brings said spurs into coincidence with said notches, another carrier being thereby released, and it will now be understood that each upward or downward movement of the frame will serve to release a carrier until the entire series have been delivered.

In order to operate frame $g$ from the outside of the camera we provide a rock shaft $h$, journaled in the sides of the box, and having on one end (outside of said box) an arm $h'$ (see Fig. 4) that may be grasped to rock the shaft $h$, the movement of said arm being limited in either direction, by the upturned ends of a plate $h^2$ secured to the box. Within the camera box, are arms $h^3$ secured to shaft $h$, near its journal ends, said arms being of such length, and so located, that they may extend toward the frame $g$ and enter slots $g^2$ provided therein, as best seen in Figs. 7, 8 and 9. When the shaft is rocked in one direction the arms $h^3$ serve to raise frame $g$ and when rocked in the opposite direction they serve to lower said frame.

Immediately beneath frame $g$ is a rock shaft $i$, journaled in the camera box and having a thumb piece $j$ or other suitable operating handle on the outside of the box by means of which the shaft may be rocked. Within the box $a$ are arms $k$ secured to shaft $i$, which arms are provided to transfer the film carriers, one at a time, from the magazine chamber to the receiving chamber $c'$. These arms $k$ are formed of spring material (as steel or hard rolled brass) to permit a certain amount of lateral deflection so that the free ends of the arms may spring outward, as they approach the film carrier last exposed, and then snap over or onto the edge of said carrier, the arms being formed with inwardly bent lugs or wings $k'$ to inclose the carrier and hold it positively while being transferred to chamber $c'$. The end of each arm which bears the inclosing wings $k'$, is bent rearward out of alignment with the main portion of the arm as shown in Fig. 5, and the sliding frame $g$ is cut away at the sides, as at $g^3$ to permit said winged end to pass rearward within the frame a distance sufficient to allow one of the wings to drop in the rear of the film carrier. The main portions of arms $k$ extend beyond the lateral portion (bearing the wings) as at $k^2$, the extreme end being engaged, when swung upward, by a cam plate $m$ secured to the side of the box having an undercut groove or channel into which the end of the arm passes as it approaches the film carrier, said channel being indicated by dotted lines in Fig. 15. The pitch of said channel is such that it serves to crowd the end of arm $k$ and the wings $k'$ outward, as the latter advance, until such time as the wings pass into proper position to clasp the carrier when the arm, as it passes beyond the cam plate, springs back to its normal position when the wings will inclose the sides of the carrier and hold it fast. While the carrier is thus held by arms $k$ the frame $g$ is moved upward or downward as the case may be, to release the carrier. If shaft $i$ and its arms $k$ are then rocked to the right hand as in Fig. 5, the carrier thus released is taken by said arms and swung downward, in an arc shaped path, until it has nearly reached a horizontal position, and is immediately over the receiving chamber $c'$, when the ends of arms $k$ encounter, and are spread by cam plates $n$ similar to those first above described and also secured to the sides of the box. These cams $n$ spring the ends of the arms outward until the wings $k'$ are withdrawn from the sides of the film carrier which then, being freed, drops by gravity into the chamber $c'$. When the arms $k$ are thus spread to drop the carrier they do not pass below and out of contact with the cams $n$ but simply pass downward until suitably spread and then slide backward on said cams as the arms return to clasp the carrier to be next exposed. When said arms engage and are operated upon by the upper cams $m$, they pass beyond said cams as above stated and when moved outward to transfer the carrier to the receiving chamber, the ends of said arms pass along the outer curved face $m'$ of said cams and are forced into closer contact with the film carrier until they pass said cams.

To retain the film carrier in the receiving chamber $c'$ we, preferably, provide a curved spring arm $o$, hung on a shaft $o'$ in a chamber $c^2$ adjacent to the receiving chamber, said arms being operated in one direction by an arm $k^3$ extending downward from shaft $i$ and in the opposite direction by its own spring, one end being coiled around shaft $o'$. When arms $k$ are swung upward to grasp a film carrier the arm $k^3$ rides on the curved spring arms $o$ and forces the free end of the latter downward upon the top carrier in the receiving chamber. When said arms $k$ drop to a horizontal position to deliver said carrier into the receiving chamber, arm $k^3$ is correspondingly moved, thus permitting the spring arm $o$ to draw back into the chamber $c^2$ out of the path of the film carrier as the latter drops by gravity into chamber $c'$. The chamber $c$ is somewhat narrower than the main chamber or camera proper, this provision being made so that there shall be ample room at the sides of the camera chamber for the described cam plates and for the arms $k$ to swing in as they transfer the film carriers.

Instead of the described rock-shaft and arms $k$ for moving frame $g$ vertically any other simple means could be substituted as, for example, a stud projecting upward therefrom and integral with said frame, as indicated in dotted lines in Fig. 9. Said stud could extend through an opening (suitably packed to exclude light) in the box $a$ and be grasped by the operator to slide the frame $g$ either upward or downward.

Any suitable or desired form of lens and shutter may be used, our present invention having no relation to these parts of the camera.

Our invention seeks specially to make it both possible and convenient to use films cut to desired dimensions instead of using such film in rolls as now quite commonly practiced. The photographer is then enabled to remove the exposed films (one or more as the case may be) without disturbing those that are unexposed.

Having thus described our invention, we claim:—

1. In combination in a photographic camera having a receiving chamber and a magazine chamber adapted to receive or carry a number of film carriers, mechanism as set forth for successively releasing said carriers, and mechanism for transferring said carriers (after exposure) to the receiving chamber, consisting of a rock shaft with radial spring arms, and mechanism for releasing the free ends of said arms to permit them to inclose and clasp the edges of said carriers: all being substantially as and for the purposes specified.

2. In combination in a photographic camera having a receiving chamber and a magazine chamber adapted to receive or carry a number of film carriers, mechanism for successively releasing said carriers after exposure, mechanism as set forth for transferring said carriers to the receiving chamber, mechanism consisting of a curved spring $o$ located in a chamber adjacent to the receiving chamber, and mechanism for swinging the free end of said spring into engagement with the top carrier in said receiving chamber: all being substantially as and for the object specified.

WILLIAM S. LAIGHTON.
A. P. HITCHCOCK.

Witnesses:
FRANK H. ALLEN,
ALONZO M. LUTHER.